(12) United States Patent
Liu et al.

(10) Patent No.: US 12,609,306 B2
(45) Date of Patent: Apr. 21, 2026

(54) ANODE MATERIAL FOR RECHARGEABLE LI-ION BATTERIES

(71) Applicant: THE REGENTS OF THE UNIVERSITY OF CALIFORNIA, Oakland, CA (US)

(72) Inventors: Haodong Liu, San Diego, CA (US); Ping Liu, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 45 days.

(21) Appl. No.: 18/206,307

(22) Filed: Jun. 6, 2023

(65) Prior Publication Data

US 2023/0317937 A1     Oct. 5, 2023

Related U.S. Application Data

(63) Continuation of application No. 17/048,467, filed as application No. PCT/US2019/027755 on Apr. 16, 2019, now abandoned.

(Continued)

(51) Int. Cl.
H01M 4/485         (2010.01)
C01G 31/00         (2006.01)
(Continued)

(52) U.S. Cl.
CPC .......... H01M 4/485 (2013.01); C01G 31/006 (2013.01); H01M 4/364 (2013.01); H01M 4/505 (2013.01);
(Continued)

(58) Field of Classification Search
CPC ...... H01M 4/485; H01M 4/364; H01M 4/505; H01M 4/525; H01M 4/625;
(Continued)

(56) References Cited

U.S. PATENT DOCUMENTS 9,634,297 B2     4/2017  Kong et al.
2003/0082446 A1  5/2003  Chiang et al.
(Continued)

FOREIGN PATENT DOCUMENTS

CN      102292853     * 12/2011    ............ H01M 4/131
JP      2002216753    *  8/2002    ............. H01M 4/58
(Continued)

OTHER PUBLICATIONS

Yue et al., "Micro-and Nano-Structured Vanadium Pentoxide (V2O5) for Electrodes of Lithium-Ion Batteries," Advanced Energy Material 2017, 7, 1602545 (Year: 2017).*

(Continued)

*Primary Examiner* — Helen Oi K Conley

(74) *Attorney, Agent, or Firm* — O'Connor & Company; Ryan P. O'Connor

(57)         ABSTRACT

Materials, designs, methods of manufacture, and devices are provided for an anode material for a rechargeable lithium-ion battery. For example, an anode material may include $Li_{3\pm x}V_{2\pm y}O_{5\pm z}$, wherein $0\le x\le 7$, $0\le y\le 1$, and z may be based on the charge resulting from $Li_{3\pm x}$ and $V_{2\pm y}$. Also, a cell can include a lithiated anode material. The lithiated anode material may include $Li_{3\pm x}V_{2\pm y}O_{5\pm z}$. The lithiated anode material may be casted on a first substrate to form a lithiated anode, having a separator stacked on the lithiated anode. The separator may include electrolytes. A cathode can be stacked on the separator. The cathode being formed by casting a cathode material on a second substrate.

8 Claims, 16 Drawing Sheets

Related U.S. Application Data

(60) Provisional application No. 62/658,558, filed on Apr. 16, 2018.

(51) Int. Cl.

| | |
|---|---|
| *H01M 4/02* | (2006.01) |
| *H01M 4/36* | (2006.01) |
| *H01M 4/505* | (2010.01) |
| *H01M 4/525* | (2010.01) |
| *H01M 4/62* | (2006.01) |
| *H01M 10/0525* | (2010.01) |

(52) U.S. Cl.
CPC ........... *H01M 4/525* (2013.01); *H01M 4/625* (2013.01); *H01M 10/0525* (2013.01); *C01P 2002/52* (2013.01); *C01P 2002/74* (2013.01); *C01P 2002/77* (2013.01); *C01P 2004/03* (2013.01); *C01P 2006/40* (2013.01); *H01M 2004/027* (2013.01)

(58) Field of Classification Search
CPC ........ H01M 10/0525; H01M 2004/027; C01G 31/006; C01P 2002/52; C01P 2002/74; C01P 2002/77; C01P 2004/03; C01P 2006/40

See application file for complete search history.

(56) References Cited

U.S. PATENT DOCUMENTS

| | | | |
|---|---|---|---|
| 2003/0124423 A1* | 7/2003 | Sasaki .............. H01M 10/0563 | |
| | | | 429/231.1 |
| 2012/0107687 A1* | 5/2012 | Ishida ................... H01M 4/621 | |
| | | | 429/223 |
| 2012/0196181 A1* | 8/2012 | Ishida ................... H01M 4/485 | |
| | | | 429/211 |
| 2014/0315097 A1 | 10/2014 | Tan et al. | |
| 2015/0044566 A1* | 2/2015 | Afyon ................... H01M 4/133 | |
| | | | 429/223 |

FOREIGN PATENT DOCUMENTS

| | | | | |
|---|---|---|---|---|
| JP | 2004-010445 | * | 1/2004 | ............. C01G 31/00 |
| WO | 2016163964 A1 | | 10/2016 | |

OTHER PUBLICATIONS

Wang et al., "Enhanced Li-ion migration behavior in Li3V2O5 rock-salt anode via stepwise lattice tailoring," EnergyStorageMaterials ,54 (2023) 284-293 (Year: 2023).*

Christensen et al., Structural Evolution of Disordered LixVO5 Bronzes in V2O5 Cathodes in Li-Ion Batteries, published Dec. 2018, Chem Material 2019,31,512-520.*

Wang et al., Enhanced Li-ion migration behavior in Li2V2O5 rock salt anode via stepwise lattice tailoring, Energy Storage Materials 54 (2023), 284-293.*

Cognac-Auradou, Les phases omega-LixV2O5, nouvveaux materiaux d'electrode pour batteries au lithium, Mar. 2007, https://theses.hal.science/tel-00139023.*

PCT/US2019/027755 International Search Report and Written Opinion, Aug. 22, 2019.

PCT/US2019/027755 International Preliminary Report on Patentability, Oct. 20, 2020.

Cognac-Auradou, "Omega-LixV205 phases, new electrode materials for lithium batteries. Structural and electrochemical characterization", 1993 Thesis, UST-Bordeaux; machine translation to English.

Liu et al., "Stable cycling of thin-film vanadium oxide electrodes between 4 and 0 V in lithium batteries", Journal of Power Sources, 119-121, Jun. 1, 2003, pp. 305-309.

Liu et al., "A disordered rock salt anode for fast-charging lithium-ion batteries", Nature, vol. 585, pp. 63-67, 2020.

Chan et al., "One-Dimensional Nanostructured Electrodes for High Capacity Lithium-Ion Battery Electrodes", Chapter 6, The Chemistry of Nanostructured Materials, pp. 175-217 (2011).

Hussein et al., "Atomic-scale investigation of the reversible alpha-to omega-phase lithium ion charge-discharge characteristics of electrodeposited vanadium pentoxide nanobelts", J. Mater. Chem. A, 2022, 10, 8515.

* cited by examiner

2600

APPLY A REDUCING AGENT TO POWDER
2602

CAST LITHIATED ANODE MATERIAL ON FIRST SUBSTRATE
2604

CAST CATHODE MATERIAL ON SECOND SUBSTRATE
2606

STACK SEPARATOR ON LITHIATED ANODE
2608

STACK CATHODE ON SEPARATOR
2610

2700

CAST ANODE MATERIAL ON FIRST SUBSTRATE
2702

CAST CATHODE MATERIAL ON SECOND SUBSTRATE
2704

STACK SEPARATOR ON ANODE
2706

STACK CATHODE ON SEPARATOR
2708

APPLY ELECTRODE TO ANODE
2710

2800

CAST ANODE MATERIAL ON FIRST SUBSTRATE
2802

PRESS LITHIUM ON ANODE
2804

CAST CATHODE MATERIAL ON SECOND SUBSTRATE
2806

STACK SEPARATOR ON PRESSED ANODE
2808

STACK CATHODE ON SEPARATOR
2810

INJECT SEPARATOR WITH ELECTROLYTES
2812

ANODE MATERIAL FOR RECHARGEABLE LI-ION BATTERIES

REFERENCE TO RELATED APPLICATIONS

The present application is continuation application of U.S. patent application Ser. No. 17/048,467, filed on Oct. 16, 2020, which is a U.S. national-phase application of PCT International Patent Application No. PCT/US2019/027755, filed on Apr. 16, 2019, which claims priority to U.S. Provisional Patent Application No. 62/658,558, filed on Apr. 16, 2018, each of which is incorporated herein by reference in its entirety.

TECHNICAL FIELD

The present disclosure is generally related to Li-ion batteries. In particular, embodiments of the present disclosure relate to an anode material for fast charging rechargeable Li-ion batteries and processes for using the same.

BACKGROUND

While Li-ion batteries provide a low maintenance, high energy density battery, compared to other battery types, Li-ion batteries take too long to charge. Moreover, current Li-ion batteries with graphite as the anode are prone to lithium plating during rapid charging, which may lead to shorting or other aging/charging issues.

BRIEF DESCRIPTION OF THE EMBODIMENTS

Disclosed are materials, designs, methods of manufacture, and devices that relate to a fast charging rechargeable Li-ion battery. An anode material may include $Li_{3\pm x}V_{2\pm y}O_{5\pm z}$, wherein $0\leq x\leq7$, $0\leq y\leq1$, and z may be based on the charge resulting from $Li_{3\pm x}$ and $V_{2\pm y}$.

In embodiments, the $Li_{3\pm x}V_{2\pm y}O_{5\pm z}$ may be an omega structure. The omega structure may be a disordered rocksalt structure in the $Fm\overline{3}m$ space group.

In embodiments, lithium may be reversibly inserted to form at least one of $Li_4V_{2\pm y}O_{5\pm z}$ and $Li_5V_{2\pm y}O_{5\pm z}$.

In embodiments, the $Li_4V_{2\pm y}O_{5\pm z}$ or $Li_5V_{2\pm y}O_{5\pm z}$ may be an omega structure. The omega structure may be a disordered rocksalt structure in the $Fm\overline{3}m$ space group.

In embodiments, the anode material may further include one or more materials selected from the group of silicon, tin, graphite, or non-graphitized carbon. The one or more materials may be blended with the anode material.

In embodiments, the cathode may be selected from the group including one or more of one or more of $LiMn_2O_4$, $LiNi_xCo_yMn_zO_2$ where x+y+z=1, or other cathodes.

In embodiments, the anode material may further include repeating the above steps to form a pouch-type cell.

Additional aspects of the present disclosure relate to an anode material. The anode material may include a composition. The composition may include $Li_3V_xM_yO_{5\pm z}$. M may be a dopant. $0.5<x<2$, $0<y<1$, and z may be based on a charge from Lia, $V_x$, and $M_y$.

In embodiments, the $Li_3V_xM_yO_{5\pm z}$ may be an omega structure. The omega structure may be a disordered rocksalt structure in the $Fm\overline{3}m$ space group.

In embodiments, the anode material may further include reversibly inserting lithium to form $Li_4V_xM_yO_{5\pm z}$ or $Li_5V_xM_yO_{5\pm z}$.

In embodiments, the $Li_4V_xM_yO_{5\pm z}$ or $Li_5V_xM_yO_{5\pm z}$ may be an omega structure. The omega structure may be a disordered rocksalt structure in the $Fm\overline{3}m$ space group.

In embodiments, the anode material may further include one or more materials selected from the group of silicon, tin, graphite, or non-graphitized carbon. The one or more materials may be blended with the anode material.

In embodiments, the dopant may be selected from the group including one or more of Mg, Ca, Sc, B, Y, Al, Ti, Zr, Nb, Ta, Cr, Mo, or W.

In embodiments, the $Li_3V_xM_yO_{5\pm z}$ may be paired with a cathode.

In embodiments, the cathode may be selected from the group including one or more of $LiMn_2O_4$, $LiNi_xCo_yMn_zO_2$ where x+y+z=1, or other cathodes.

In embodiments, the anode material may further include repeating the above steps to form a pouch-type cell.

In embodiments, the cell may be rolled to form a cylinder cell.

In embodiments, the anode may be paired with conductive additives and binders.

In embodiments, the conductive additives may include conductive carbon additives.

Additional aspects of the present disclosure relate to an anode material including a composition. The composition may include $Li_{3\pm x}V_{2\pm y}M_yO_{5\pm z}$. M may be a dopant. $0<x<2$, $0<y<1$, and z may be based on a charge from $Li_{3\pm x}$, $V_{2\pm y}$, and $M_y$.

Additional aspects of the present disclosure relate to a cell. The cell may include a lithiated anode material. The lithiated anode material may include $Li_{3\pm x}V_{2\pm y}O_{5\pm z}$. $0\leq x\leq7$, $0\leq y\leq1$, and z may be based on the charge resulting from $Li_{3\pm x}$ and $V_{2\pm y}$. The lithiated anode material may be casted on a first substrate to form a lithiated anode. The cell may include a separator stacked on the lithiated anode. The separator may include electrolytes. The cell may include a cathode stacked on the separator. The cathode may be formed by casting a cathode material on a second substrate. The cell may include a packet foil surrounding the lithiated anode, the separator, and the cathode.

Additional aspects of the present disclosure relate to a method of manufacturing a cell. The method may include forming a lithiated anode material by applying a reducing agent to a powder. The lithiated anode material may include an omega structure $Li_3V_2O_5$. The omega structure may be a disordered rocksalt structure in the $Fm\overline{3}m$ space group. The reducing agent may include lithium. The powder may include $Li_3V_2O_5$. The method may include casting the lithiated anode material on a first substrate to form a lithiated anode. The method may include casting a cathode material on a second substrate to form a cathode. The method may include stacking a separator on the lithiated anode. The method may include stacking a cathode on the separator.

In embodiments, the first substrate may include copper.

In embodiments, the lithiated anode may further include one or more materials selected from the group of silicon, tin, graphite, or non-graphitized carbon.

In embodiments, the cathode may be selected from the group including one or more of $LiMn_2O_4$ and $LiNi_xCo_yMn_zO_2$, where x+y+z=1.

In embodiments, the second substrate may include aluminum.

Additional aspects of the present disclosure relate to a method of manufacturing a cell. The method may include casting an anode material on a first substrate to form an anode. The anode material may include $V_2O_5$. The method may include casting a cathode material on a second substrate to form a cathode. The method may include stacking a separator on the anode. The method may include stacking the cathode on the separator. The method may include applying an electrode to the anode to synthesize the anode into a lithiated anode. The electrode may include lithium. The lithiated anode may include an omega structure $Li_3V_2O_5$. The omega structure may be a disordered rocksalt structure in the Fm$\overline{3}$m space group.

Additional aspects of the present disclosure relate to a method of manufacturing a lithiated anode. The method may include casting an anode material on a first substrate to form an anode. The anode material may include $V_2O_5$. The method may include pressing lithium on the anode to form a pressed anode. The method may include casting a cathode material on a second substrate to form a cathode. The method may include stacking a separator on the pressed anode. The method may include stacking the cathode on the separator. The method may include injecting the separator with electrolytes, thereby synthesizing the pressed anode into a lithiated anode.

Additional aspects of the present disclosure relate to a method of manufacturing a cell. The method may include forming a lithiated anode material by applying a reducing agent to a powder. The lithiated anode material may include an omega structure $Li_3V_2O_5$. The omega structure may be a disordered rocksalt structure in the Fm$\overline{3}$m space group. The reducing agent may include lithium. The powder may include $Li_3V_2O_5$. The method may include casting the lithiated anode material on a first substrate to form a lithiated anode.

In embodiments, the method may further include casting a cathode material on a second substrate to form a cathode. The method may further include stacking a separator on the lithiated anode. The method may further include stacking a cathode on the separator.

BRIEF DESCRIPTION OF THE DRAWINGS

Various embodiments are disclosed herein and described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
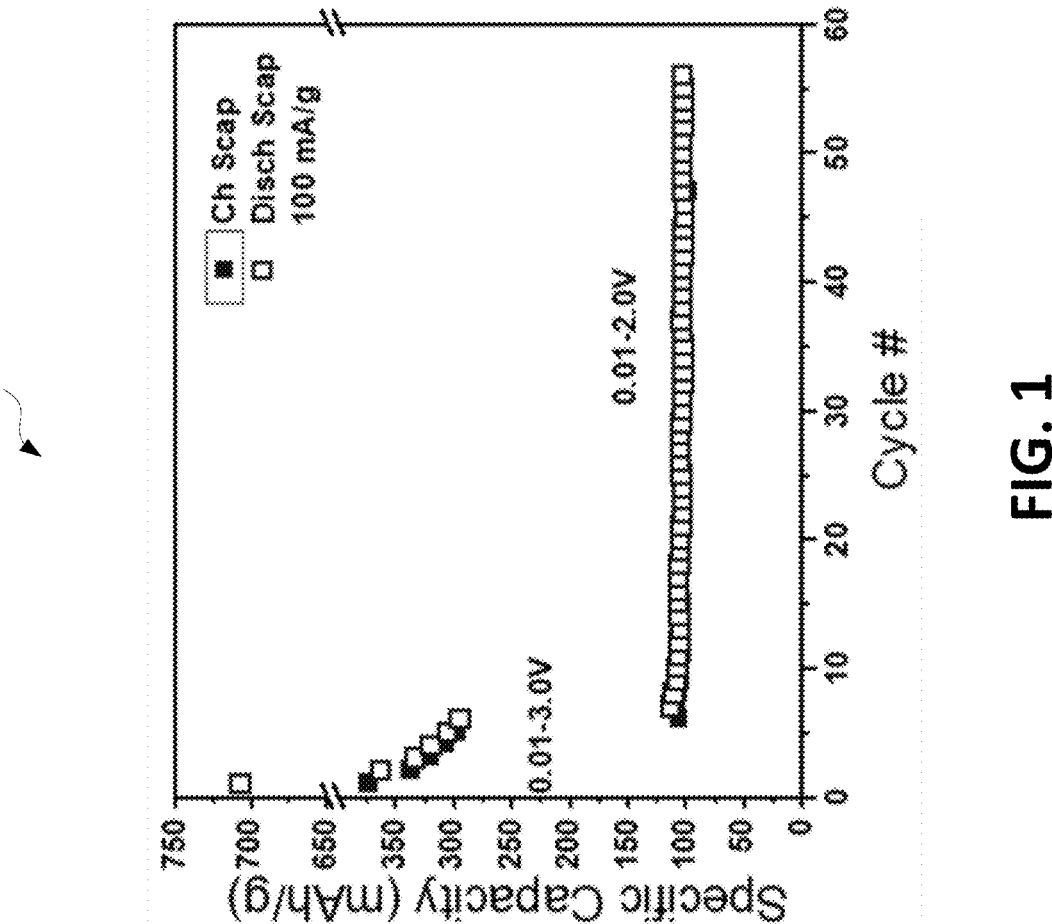
FIG. 1 illustrates a graph indicating the stability of the $V_2O_5$ and $Li_3V_2O_5$ electrode over multiple cycles in accordance to one embodiment of the present disclosure.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

In the past decades, rechargeable Li-ion batteries have made mobile devices and personal computers an essential necessity in a modern day society. While important advancements in battery technology (e.g., energy density and structural stability) have continued, fast charging is an area that still requires significant advances for Li-ion batteries. Li-ion batteries may possess high energy density; however, the rate at which the battery can charge may be affected by the corresponding anode material of the battery.

Currently, graphite is used as an anode and operates at a potential similar to lithium metal plating (about 90 mV). Under rapid charging, the lithium metal plates onto the graphite surfaces, which leads to capacity fading, potential internal shorting, and safety incidents. Lithium titanium oxide ($Li_4Ti_5O_{12}$) may also be used as an anode. Lithium titanium oxide may be capable of rapid charging. However, lithium ion batteries using lithium titanium oxide have a cell voltage of about 1.4 V less than that of graphite-based cells. The cell voltage may be reduced from about 3.7 V to about 2.3 V. Thus, an anode material with a high rate capability that operates between about 0.1 V and about 1V is disclosed.

Disclosed are materials, designs, methods of manufacture, and devices related to fast-charging Li-ion batteries. The fast-charging Li-ion battery may include substrates, an anode material, a cathode, an electrolyte, a separator, and a packet foil. The Li-ion batteries may be able to charge on the scale of minutes instead of hours. The battery may be one or more of a pouch-type, cylinder, button, prismatic, or other battery types. In embodiments, the cell may be formed to have the specifications as listed in Table 1. All of the values listed in this disclosure are approximate, unless expressly indicated otherwise.

TABLE 1

| Cell design for 2 Ah pouch cell. | | |
|---|---|---|
| Dimension | Thickness, max (mm) | 4.5 |
| Cathode | Capacity (mAh/g) | 190 |
| | Active Material Loading | 90% |
| | Coating Weight (mg/cm$^2$ each side) | 14.3 |
| | Areal Capacity (mAh/cm$^2$ each side) | 2.45 |
| | Electrode Press Density (g/cm$^3$) | 2.86 |
| | Electrode Length (mm) | 56 |
| | Electrode Width (mm) | 43 |
| | Electrode Thickness (single side) (um) | 45 |
| | Al Foil Thickness (um) | 15 |
| | Double Layers | 17 |

TABLE 1-continued

| Cell design for 2 Ah pouch cell. | | |
|---|---|---|
| Anode | Cell Balance (N/P ratio) | 1.08 |
| | Capacity (mAh/g) | 300 |
| | Active Material Loading | 90% |
| | Coating Weight (mg/cm$^2$ each side) | 9.8 |
| | Areal Capacity (mAh/cm$^2$ each side) | 2.64 |
| | Electrode Press Density (g/cm$^3$) | 2.26 |
| | Electrode Length (mm) | 58 |
| | Electrode Width (mm) | 45 |
| | Electrode Thickness (single side) (um) | 39 |
| | Cu Foil Thickness (um) | 10 |
| | Double Layers | 18 |
| Electrolyte | Electrolyte/Capacity (g/Ah) | 3 |
| | Weight (g) | 6 |
| Separator | Total Wrapping Length (mm) | 1750 |
| | Thickness (um) | 20 |
| Packet Foil | Thickness (um) | 115 |
| Cell | Voltage (V) | 3.2 |
| | Capacity (mAh) | 2031 |
| | Energy (mWh) | 6499 |
| | Weight (g) | ~32 |
| | Energy density (Wh/kg) | >200 |

For example, a battery may be used for powering personal electronics to cars, neighborhoods, and other systems. A battery may include a group of cells. Cells may be individual electrochemical units including individual assemblies. In some embodiments, the cell voltage may range from about 1 volt to about 5 volts. In embodiments, the capacity may range from about 1500 mAh to about 50000 mAh. In some embodiments, the cell may have an energy ranging from about 1500 mWh to about 250000 mWh. In some embodiments, the cell may have an energy density ranging from about 150 Wh/kg to about 500 Wh/kg.

The cell may include a cathode. The cathode may include one or more of $LiMn_2O_4$, $LiNi_xCo_yMn_zO_2$ where x+y+z=1, and other cathodes. The cathode may be paired with a given anode based on corresponding compositions.

In embodiments, the cathode may have a capacity ranging from about 50 mAh/g to about 300 mAh/g. In some embodiments, the active material loading may range from about 50% to about 100%. In embodiments, the coating weight for each side may range from about 3 mg/cm$^2$ to about 25 mg/cm$^2$. In some embodiments, the areal capacity may represent the energy capacity as a function of the size of a given battery. The areal capacity for each side of the cathode may range from about 0.5 mAh/cm$^2$ to about 10 mAh/cm$^2$.

In some embodiments, the cathode press density may range from about 0.5 g/cm$^3$ to about 10 g/cm$^3$. Aluminum foil may be used as a substrate upon which to place the cathode material. In embodiments, the cathode material may be cast, laminated, pressed, or otherwise coupled to the aluminum foil. In some embodiments, the aluminum foil thickness may range from about 1 um to about 50 um. It should be appreciated that other materials may be used as a substrate for the cathode. The number of double layers may range from about 5 to about 50.

As described above, the cell may include anode material. The anode material may be able to facilitate a Li-ion battery charging on the scale of minutes without a complicated nanosizing process. The anode material could enable a fast charge battery without sacrificing energy density. In embodiments, the anode material may show a voltage plateau ranging from about 0 V to about 1 V. In some embodiments, the voltage plateau may be about 0.5 V. The range of the voltage potential may ensure that under high current, the electrode potential achieves a value that does not cause lithium plating. The range of the voltage potential may also ensure that the cell voltage does not decrease to less than about 3.0 V, when a common cathode material is used. The anode material may work at a voltage at about 0.5V, which reduces the risk of lithium plating but results in a lithium-ion battery with cell voltage about 1 V higher than that with a $Li_4Ti_5O_{12}$ anode, as discussed above.

In embodiments, the anode material includes $V_2O_5$. In some embodiments, the $V_2O_5$ electrode may be lithiated. Lithiating may include treating a material or substance with lithium or one of its compounds. In some embodiments, the lithiated $V_2O_5$ may form one or more of $Li_3V_2O_5$, $Li_5V_2O_5$, and other compositions with the general formula $Li_xV_2O_5$, where $3 \leq x \leq 5$. The $Li_3V_2O_5$ may be introduced as an anode material that enables two lithium to be reversibly inserted to form $Li_5V_2O_5$. In some embodiments, inserting lithium into the $V_2O_5$ can form an omega structure $Li_3V_2O_5$, which may be a disordered rocksalt structure in the $Fm\overline{3}m$ space group. The rocksalt structure may be well maintained from $Li_3V_2O_5$ to $Li_5V_2O_5$, which can be indexed in the cubic system (a=4.1 Å).

In some embodiments, $Li_3V_2O_5$ may represent a base composition to which dopants may be added. The composition may have a rocksalt structure, into which two more lithium can be inserted into $Li_3V_2O_5$ to form a nominal composition of $Li_5V_2O_5$, where the rocksalt structure is still preserved in the $Li_5V_2O_5$ composition. The general formula for the composition may be $Li_{3\pm x}V_{2\pm y}M_yO_{5\pm z}$, wherein $0 \leq x \leq 7$, $0 \leq y \leq 2$, and where z depends on the combined positive charge of Li, V and M so that the oxygen balances out the combined positive charge. M may be a dopant used in addition to, or instead of, V. In some embodiments, the dopants may include one or more metal dopants. The metal dopants may include one or more divalent, trivalent, tetravalent, pentavalent, or hexavalent dopants, such as Mg, Ca, Sc, B, Y, Al, Ti, Zr, Nb, Ta, Cr, Mo, W, or other metal dopants.

The omega structure may be a disordered rocksalt structure in the $Fm\overline{3}m$ space group with octahedral and tetrahedral sites. The crystal structure model may include oxygen ions, $Li_{tet}$, $Li/V_{oct}$, lithium and vanadium ions, and lithium ions. Oxygen ions may be closely-packed serving as a frame for the omega structure of $Li_3V_2O_5$. In embodiments, the oxygen ions may be located at the corners and face centers of the crystal structure. In some embodiments, lithium ions and vanadium ions may be located at the edge centers of the crystal structure. In embodiments, the lithium and vanadium ions may sit in the octahedral sites coordinated. In some embodiments, the lithium ions may occupy the tetrahedral sites. The omega structure is discussed in greater detail below.

In embodiments, the anode may include active materials, conductive carbon additives, binders, and additional Li sources. In some embodiments, active material may include one or more of the above disclosed anode materials and other active materials. In embodiments, conductive additives may improve the life cycle of a cell as well as the energy density of a cell. Conductive carbon additives may include one or more of carbon nanotubes, carbon blacks, ultra-fine carbon, and other carbon additives. In some embodiments, binders may hold active material together as well as place them in contact with the foil corresponding to an electrode. The binders may also help keep conductive carbon additives in place against the active material. The binders may include one or more of homopolymers, copolymers, polyvinylidene fluoride, styrene butadiene copolymer, and other binders.

In some embodiments, the anode may have a negative to positive electrode (N to P) ratio, ranging from about 0.8 to about 1.5. In embodiments, the anode may have a capacity ranging from about 100 mAh/g to about 500 mAh/g. In some embodiments, the active material loading may range from about 50% to about 100%. In embodiments, the coating weight for each side may range from about 3 mg/cm$^2$ to about 25 mg/cm$^2$. In some embodiments, the areal capacity for each side of the anode may range from about 0.5 mAh/cm$^2$ to about 10 mAh/cm$^2$.

In some embodiments, the electrode press density may range from about 0.5 g/cm$^3$ to about 10 g/cm$^3$. Copper foil may be used as a substrate upon which to place the anode material. In embodiments, the anode material may be cast, laminated, pressed, or otherwise coupled to the copper foil. In some embodiments, the copper foil thickness may range from about 1 um to about 200 um. It should be appreciated that other materials may be used as a substrate for the anode. In embodiments, the number of double layers may range from about 5 to about 50.

Electrolytes may be used to fill the separator that promotes the movement of ions between the cathode and the anode during charge and discharge (e.g., during charge the ions move from cathode to anode; while discharging the ions move from anode to cathode). In some embodiments, the electrolyte may have an electrolyte/capacity value ranging from about 1 g/Ah to about 10 g/Ah. In some embodiments, the electrolytes may include organic solvents selected from one or more of ethylene carbonate, dimethyl carbonate, diethyl carbonate, ethyl methyl carbonate, and other organic solvents. The electrolytes may further include lithium salts, such as $LiPF_6$, $LiClO_4$, $LiBF_4$, $LiAsF_6$, LiTFSI, LiFSI, and other salts. TFSI may refer to bis(trifluoromethanesulfonyl) imide and FSI refers to Bis(fluorosulfonyl)imide.

The separator may insulate the cathode from the anode. The separator may have no electrical conductivity. The separator may be made of one or more of rubber, glass fiber, cellulose, polyethylene plastic, polyolefin, and other materials. The separator may be porous to hold the electrolyte. In some embodiments, the pore size ranges from about 10 nm to about 150 nm. The separator may be made to close the pores when the temperature breaches a threshold to prevent the reaction from escalating. In some embodiments, the separator may be coated with another material that will close over the pores to prevent overheating.

The packet foil may insulate the anode-separator-cathode assembly from an external environment. The packet foil may range from about 50 um to about 200 um.

It should be appreciated that while individual values within the ranges need not be achieved, the ratios between one or more values may be relevant in scaling the cell for different applications. The ranges are provided as example embodiments of cells for a given application, and it should be appreciated that different ranges may be appropriate for different applications.

FIG. 1 illustrates graph 100 indicating the stability of the $V_2O_5$ electrode over multiple cycles in accordance to one embodiment of the present disclosure. As illustrated, the capacity of the battery using a $V_2O_5$ electrode stays substantially consistent around 100 mAh/g for multiple cycles of charging and discharging. In the first set of cycles, the electrode material was discharged to about 0.01 V and charged to about 3.0 V and lost some capacity. As illustrated, the $V_2O_5$ electrode first discharges at around 800 mAh/g and before the 10th charge the specific capacity moves to about 300 mAh/g. The second set of cycles discharged to about 0.01 V and charged to about 2.0 V and substantially maintained the capacity around 100 mAh/g. The test used to generate the graph used a current density of about 100 mA/g.

Figure 2:
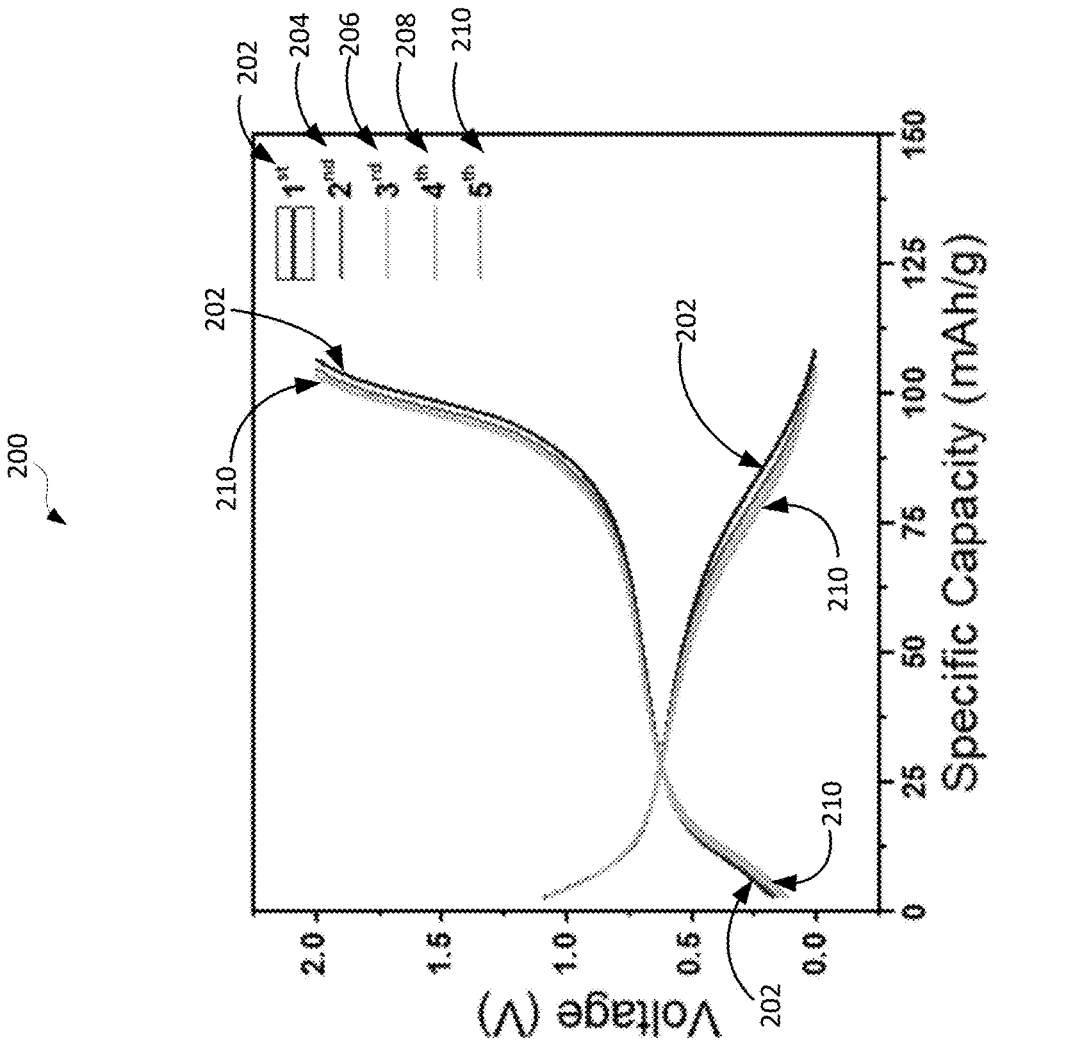
FIG. 2 illustrates a graph of voltage profiles indicating the stability of the $Li_3V_2O_5$ electrode over multiple cycles in accordance to one embodiment of the present disclosure.

FIG. 2 illustrates graph 200 of voltage profiles indicating the stability of the $Li_3V_2O_5$ electrode over multiple cycles in accordance to one embodiment of the present disclosure. As illustrated, the voltage profiles remain substantially the same over multiple charges and discharges. The test may be substantially similar to the test as described in FIG. 1. The voltage profiles may more clearly indicate that the specific capacity is maintained at around 110 mAh/g for both charges and discharges.

Figures 3, 4:
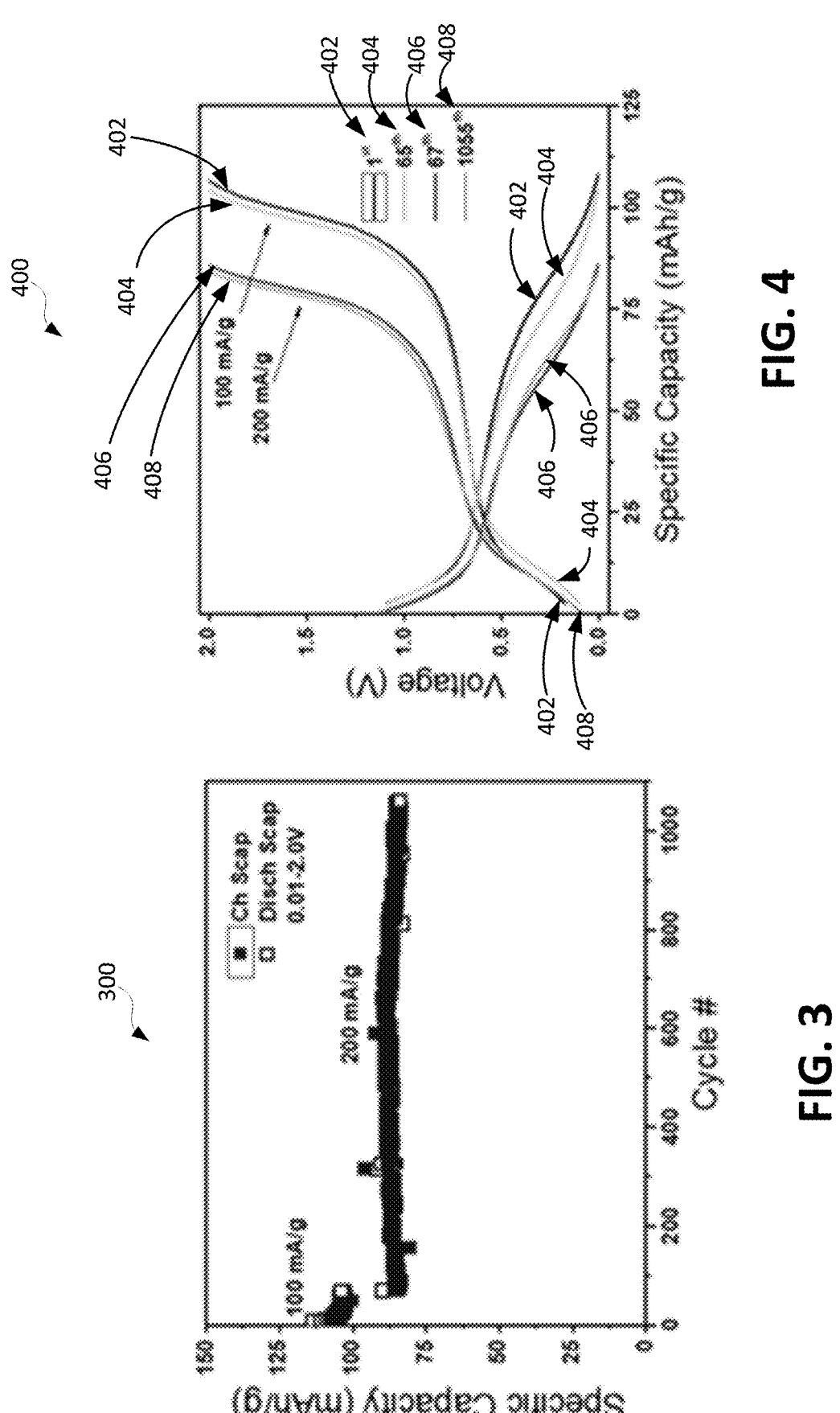
FIG. 3 illustrates a graph indicating the stability of the $Li_3V_2O_5$ electrode after more than 1000 cycles in accordance to one embodiment of the present disclosure.
FIG. 4 illustrates a graph of voltage profiles indicating the stability of the $Li_3V_2O_5$ electrode after more than 1000 cycles in accordance to one embodiment of the present disclosure.

FIG. 3 illustrates graph 300 indicating the stability of the $Li_3V_2O_5$ electrode after more than 1000 cycles in accordance to one embodiment of the present disclosure. As illustrated, the capacity of the $Li_3V_2O_5$ electrode stays substantially consistent over about 1000 cycles. Graph 300 also indicates an operating potential of about 0.5 V and a capacity of about 280 mAh/g. The electrode could achieve high capacity greater than about 10 C current density, which translates to less than about six minutes of charge time. As illustrated, the electrode material maintains stable structure over long term cycling. The battery using this anode material could improve expected energy density by about 85%.

In the first 100 or so cycles, the anode material was subjected to a current density of about 100 mA/g where the greatest loss in capacity is shown. In the remaining cycles, a current density of about 200 mA/g is used and the capacity is shown as staying substantially around 90 mAh/g.

FIG. 4 illustrates graph 400 of voltage profiles indicating the stability of the $Li_3V_2O_5$ electrode after more than 1000 cycles in accordance to one embodiment of the present disclosure. As illustrated, the voltage profiles remain substantially the same over about 1000 charges and discharges. The anode used for testing may be substantially similar to the one described in FIG. 3. The voltage profile may more clearly indicate the effect of charges or discharges, or the lack of effect, on the specific capacity over the 1000 or so cycles. As illustrated, the first set of cycles provided a greater specific capacity for charge and discharge around 110 mAh/g. Around the $67^{th}$ cycle, a current density of about 200 mA/g is used and the specific capacity lowers to about 90 mAh/g. For the next 1000 or so cycles, the specific capacity stays around 90 mA/g.

Figure 5:
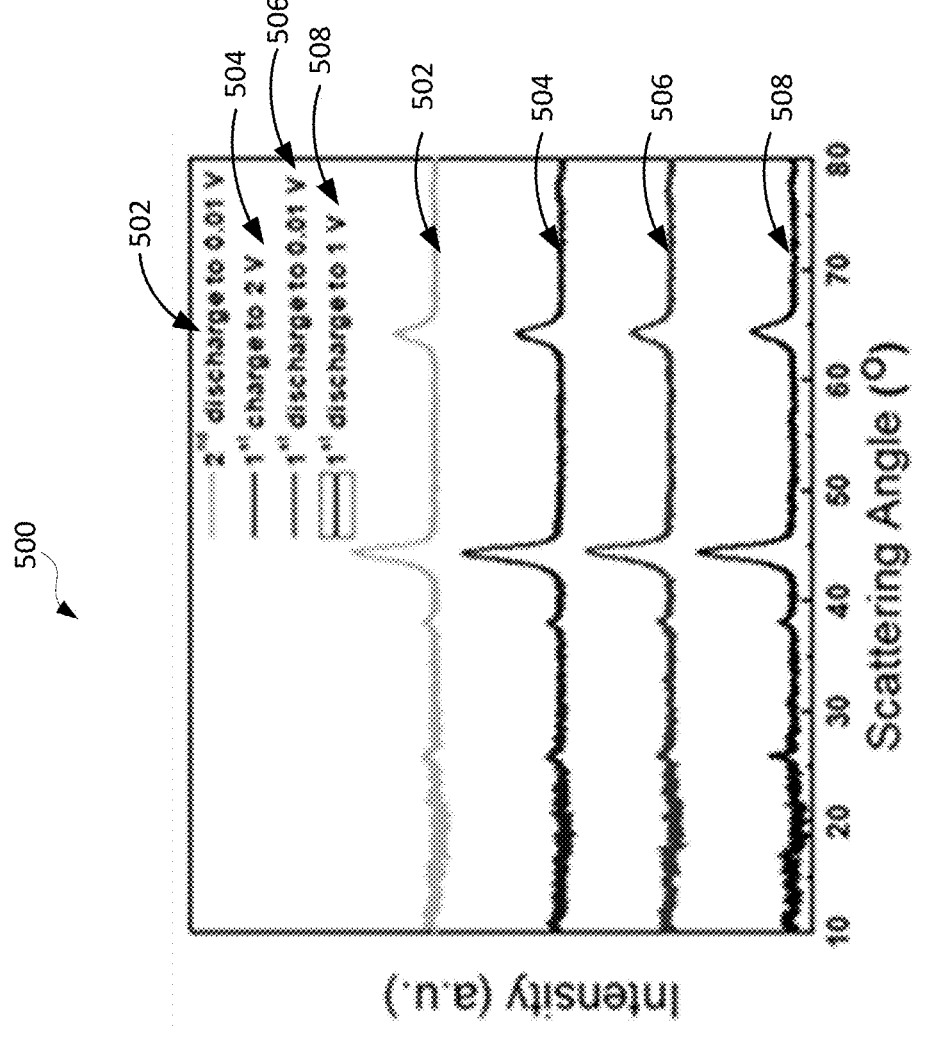
FIG. 5 illustrates an X-ray diffraction (XRD) graph indicating the stability of the $Li_3V_2O_5$ electrode, the rocksalt structure is well maintained through $Li_3V_2O_5$ to $Li_5V_2O_5$ in accordance to one embodiment of the present disclosure.
Figures 6, 7, 8, 9, 10, 11, 12, 13:
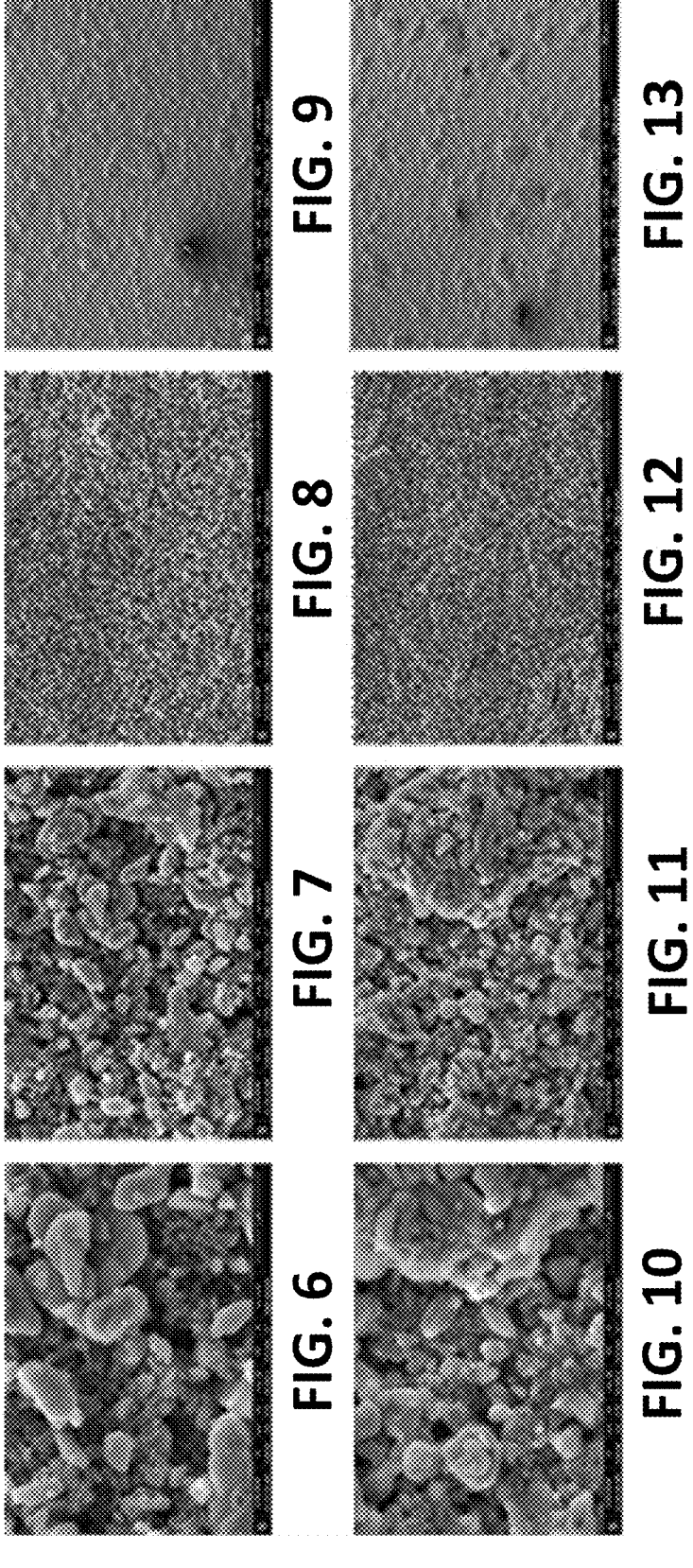
FIG. 6 illustrates an image captured using a scanning electron microscope (SEM) before cycling an anode, in accordance to one embodiment of the present disclosure.
FIG. 7 illustrates an image captured using a SEM before cycling an anode, in accordance to one embodiment of the present disclosure.
FIG. 8 illustrates an image captured using a SEM before cycling an anode, in accordance to one embodiment of the present disclosure.
FIG. 9 illustrates an image captured using a SEM before cycling an anode, in accordance to one embodiment of the present disclosure.
FIG. 10 illustrates an image captured using a scanning electron microscope (SEM) after cycling the anode of FIG. 6, in accordance to one embodiment of the present disclosure.
FIG. 11 illustrates an image captured using a SEM after cycling the anode of FIG. 7, in accordance to one embodiment of the present disclosure.
FIG. 12 illustrates an image captured using a SEM after cycling the anode of FIG. 8, in accordance to one embodiment of the present disclosure.
FIG. 13 illustrates an image captured using a SEM after cycling the anode of FIG. 9, in accordance to one embodiment of the present disclosure.

FIG. 5 illustrates X-ray diffraction (XRD) graph 500 indicating the stability of the $Li_3V_2O_5$ electrode in accordance to one embodiment of the present disclosure. As illustrated, the XRD graph indicates the rocksalt structure is maintained from $Li_3V_2O_5$ to $Li_5V_2O_5$. The peak positions are not shifted during charge and discharge, which may indicate that the $Li_3V_2O_5$ may be a low-strain material. Low-strain material may refer to minimal volume change to the material during charge and discharge. Even as the electrode material is charged to and discharged from 2 V, the XRD shows a similar rocksalt structure of the electrode material.

FIGS. 6-9 illustrate sets of images before cycling, in accordance with various embodiments of the present disclosure. The sets of images gathered using a scanning electron microscope (SEM) indicate pictures of a given anode material before a charge/discharge cycle.

FIGS. 10-13 illustrates sets of images after cycling, in accordance with various embodiments of the present disclosure. The sets of images gathered using a scanning electron microscope (SEM) indicate pictures of the given anode material of FIGS. 6-9 after the charge/discharge cycle. As illustrated, the anode material is substantially the same before cycling and after cycling, and the particles in the anode material remain a substantially similar size in each set of images and are otherwise minimally affected.

Figure 14:
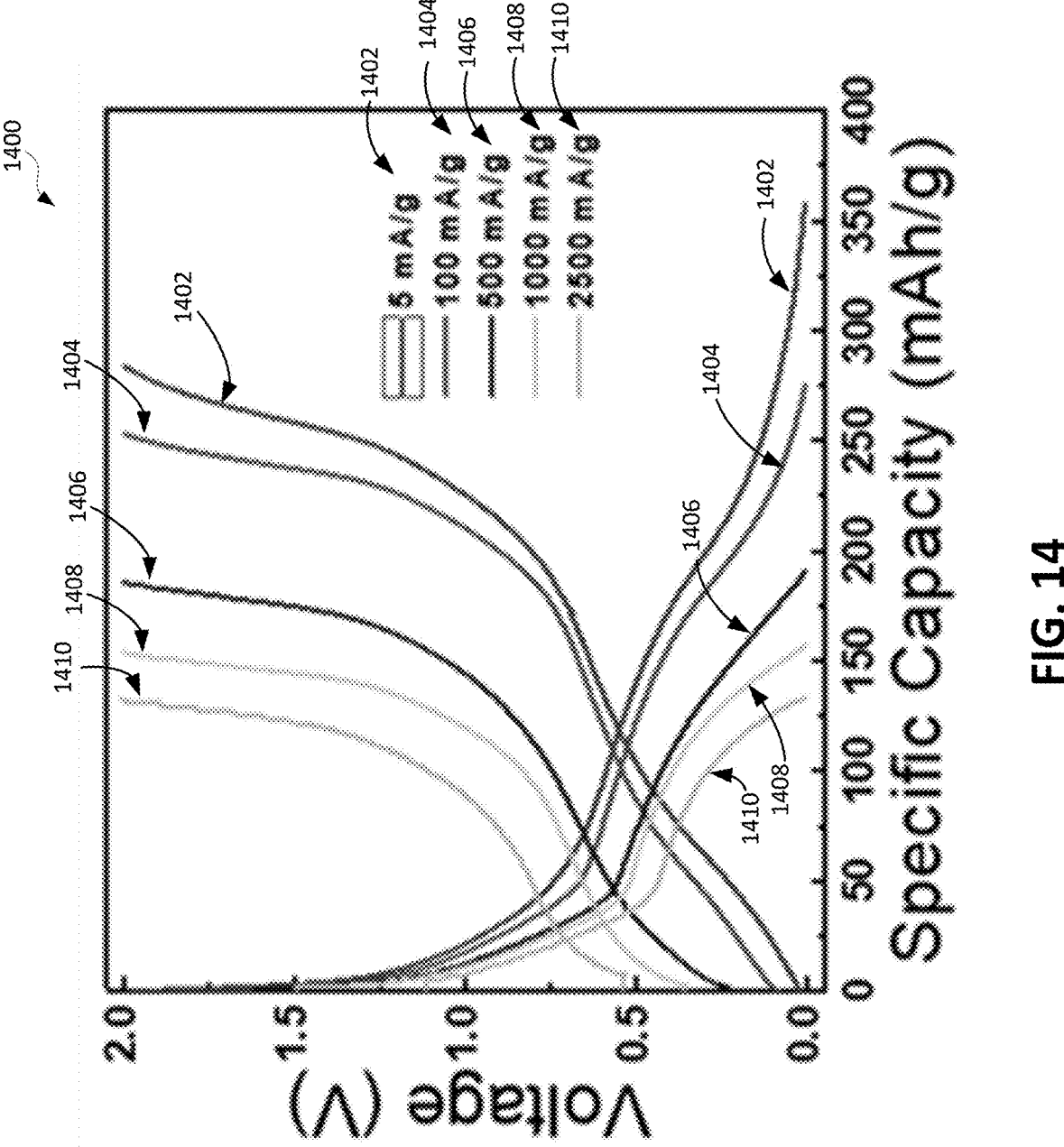
FIG. 14 illustrates a graph of voltage profiles of a second generation $Li_3V_2O_5$ electrode under different current density in accordance to one embodiment of the present disclosure.

FIG. 14 illustrates graph 1400 of voltage profiles of a second generation $Li_3V_2O_5$ electrode under different current density in accordance to one embodiment of the present disclosure. As illustrated, the discharge capacity of $Li_3V_2O_5$ exceeds 300 mAh/g at 5 mA/g current density. There is almost no voltage hysteresis at 100 mA/g current density. Even at a high discharge current of 2.5 A/g, the material still shows a capacity of more than 125 mAh/g. 1402 may represent rate performance of a cell with 5 mA/g current capacity. 1404 may represent rate performance of a cell with 100 mA/g current capacity. 1406 may represent rate performance of a cell with 500 mA/g current capacity. 1408 may represent rate performance of a cell with 1000 mA/g current capacity. 1410 may represent rate performance of a cell with 2500 mA/g current capacity.

Figure 15:
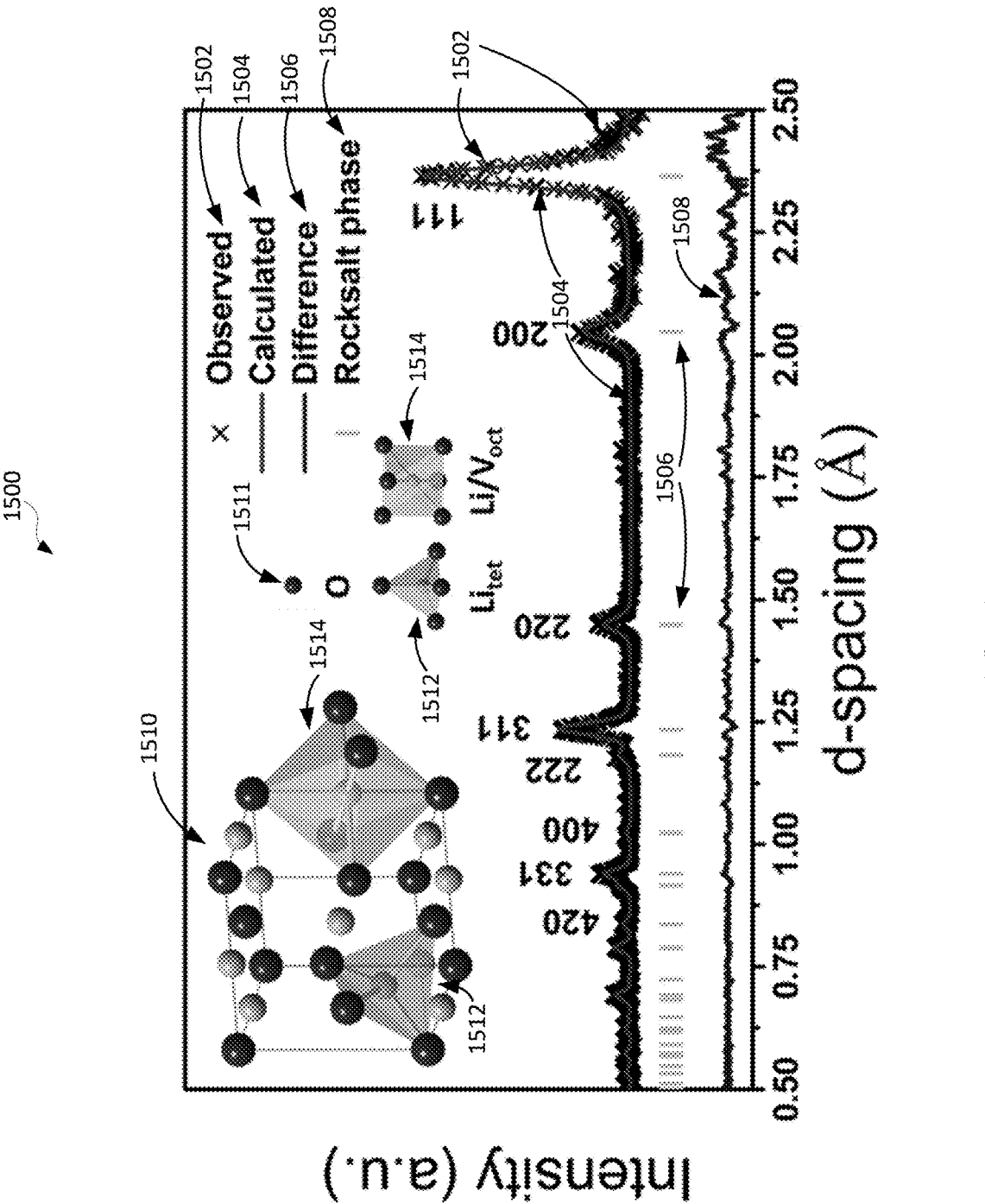
FIG. 15 illustrates a neutron diffraction of an anode and the corresponding crystal structure model, in accordance with various embodiments of the present disclosure.

FIG. 15 illustrates neutron diffraction 1500 of an anode material and corresponding crystal structure model 1510, in accordance with various embodiments of the present disclosure. 1502 may represent observed values in the neuron diffraction of $Li_3V_2O_5$. 1502 may be illustrated as "x"s. 1504 may represent calculated values for the neuron diffraction values of $Li_3V_2O_5$. 1504 may be illustrated as a line. 1506 may represent the difference between the observed values and the calculated values, which stays substantially consistent. 1506 may be illustrated as a line. 1508 may represent rocksalt phases. 1508 may be illustrated as vertical bars. Peaks in 1502 and 1504 may correspond to 1508.

Crystal structure model 1510 may be the omega structure of $Li_3V_2O_5$. The omega structure may be similar to a disordered rocksalt structure with a $Fm\overline{3}m$ space group. 1511 may represent oxygen ions. 1512 may represent $Li_{tet}$ and 1514 may represent $Li/V_{oct}$. 1511 may be a part of 1512 and 1514. 15111, 1512, 1514 may be part of crystal structure model 1510.

Oxygen ions 1511 may be close-packed in crystal structure model 1510, serving as a frame for the rocksalt structure of $Li_3V_2O_5$. In crystal structure model 1510, the oxygen ions 1511 may be located at the corners and face centers. Lithium ions and vanadium ions may be located at the edge centers, represented by the other spheres. The lithium and vanadium ions 1514 may sit in the octahedral sites coordinated by, as illustrated, six oxygen ions. Part of the lithium ions 1512 may occupy the tetrahedral sites coordinated by, as illustrated, four oxygen ions.

Figure 16:
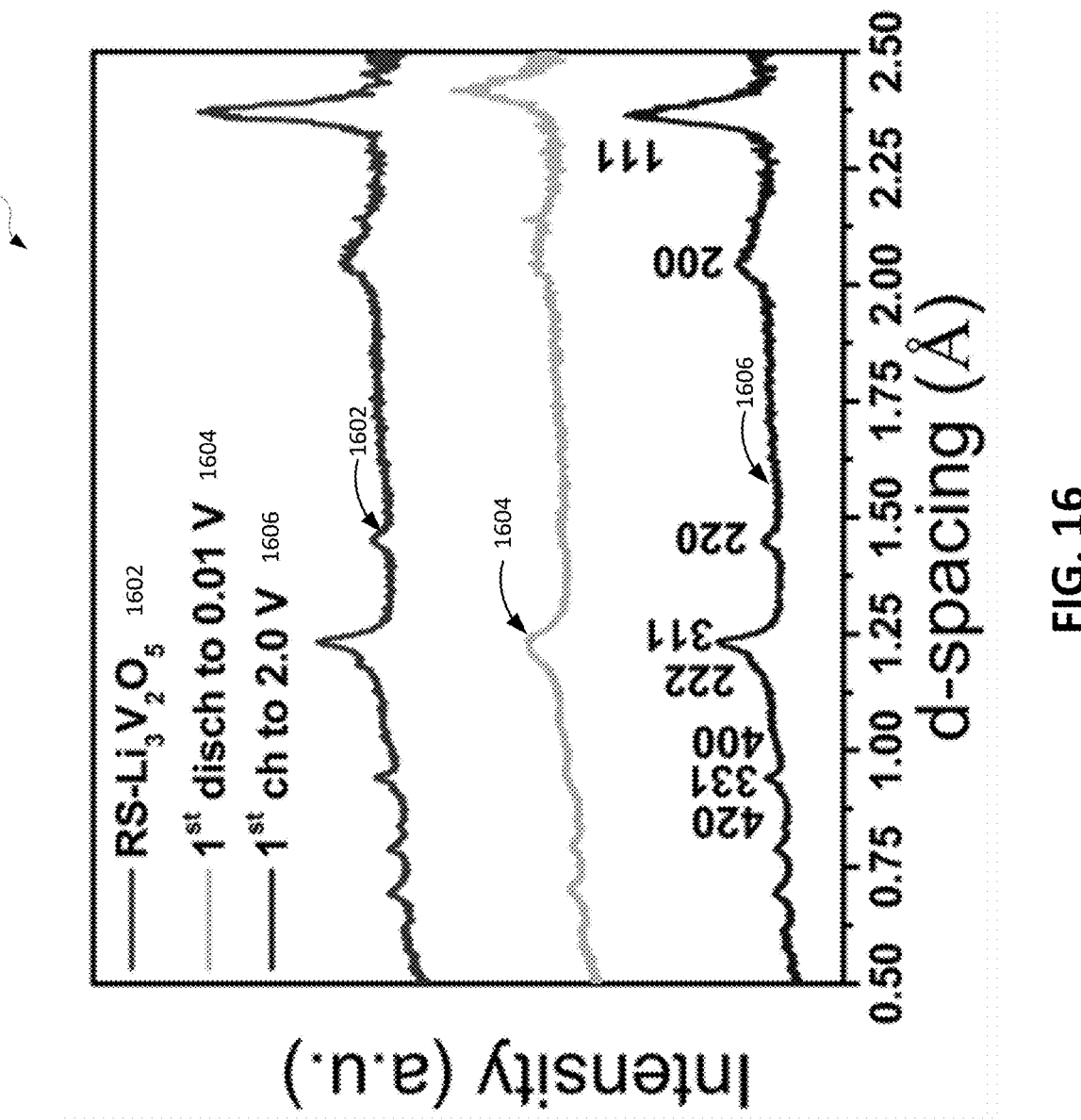
FIG. 16 illustrates a neutron diffraction of an anode in various states, in accordance with various embodiments of the present disclosure.

FIG. 16 illustrates neutron diffraction 1600 of an anode material in various states, in accordance with various embodiments of the present disclosure. 1602 may represent the neutron diffraction of $Li_3V_2O_5$. 1604 may represent discharging the rocksalt structure of $Li_3V_2O_5$ to about 0.01 V. 1606 may represent charging the rocksalt $Li_3V_2O_5$ to about 2.0 V. As illustrated, the cubic rocksalt phase is maintained during the charge and discharge. The structure may be highly reversible. In the lithiated state, the volume expansion of the cubic structure may be less than about 7%.

Figures 17, 18, 19, 20, 21, 22:
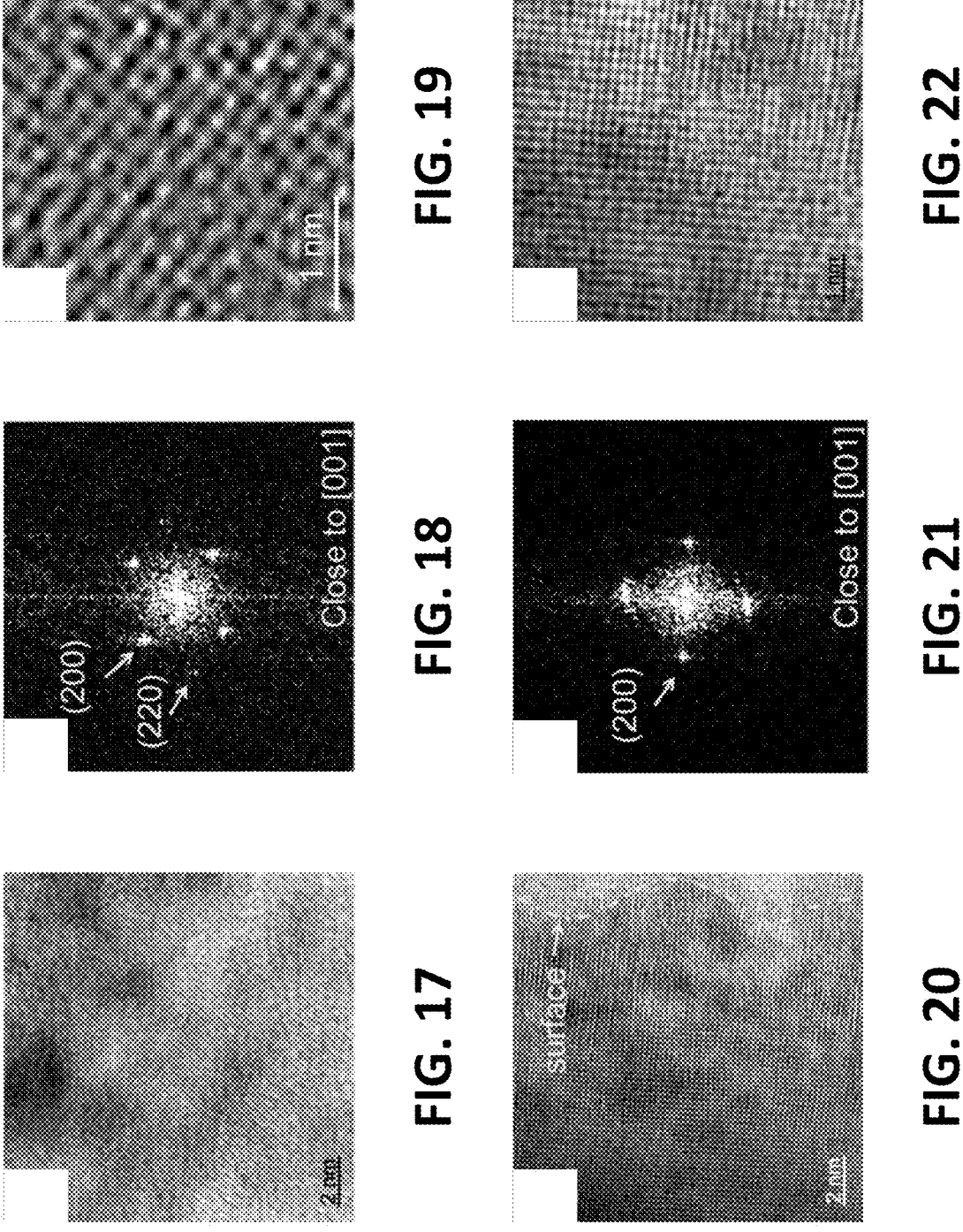
FIG. 17 illustrates an image of an omega structure of an anode, in accordance with various embodiments of the present disclosure.
FIG. 18 illustrates an image of an omega structure of an anode, in accordance with various embodiments of the present disclosure.
FIG. 19 illustrates an image of an omega structure of an anode, in accordance with various embodiments of the present disclosure.
FIG. 20 illustrates an image of a lithiated structure of the anode of FIG. 17, in accordance with various embodiments of the present disclosure.
FIG. 21 illustrates an image of a lithiated structure of the anode of FIG. 18, in accordance with various embodiments of the present disclosure.
FIG. 22 illustrates an image of a lithiated structure of the anode of FIG. 19, in accordance with various embodiments of the present disclosure.

FIG. 17 illustrates an image of an omega structure of an anode material, in accordance with various embodiments of the present disclosure. The image may be taken using a microscope. The image may illustrate a face center cubic (FCC) structure.

FIG. 18 illustrates an image of an omega structure of an anode material, in accordance with various embodiments of the present disclosure. The image may be taken using a microscope. The image may illustrate a face center cubic (FCC) structure. 200 and 220 may represent the electron diffraction peaks of the anode material.

FIG. 19 illustrates an image of an omega structure of an anode material, in accordance with various embodiments of the present disclosure. The image may be taken using annular bright-field scanning transmission electron microscopy. The image may illustrate a face center cubic (FCC) structure. The atoms in the cubic structure are illustrated with the dots.

FIG. 20 illustrates an image of a lithiated structure of the anode material of FIG. 17, in accordance with various embodiments of the present disclosure. The image may be taken using a microscope. The image may illustrate that the rocksalt structure is maintained after lithiating the $Li_3V_2O_5$.

FIG. 21 illustrates an image of a lithiated structure of the anode material of FIG. 18, in accordance with various embodiments of the present disclosure. The image may be taken using a microscope. The image may illustrate that the rocksalt structure is maintained after lithiating the $Li_3V_2O_5$.

FIG. 22 illustrates an image of a lithiated structure of the anode material of FIG. 19, in accordance with various embodiments of the present disclosure. The image may be taken using annular bright-field scanning transmission electron microscopy. The image may illustrate that the rocksalt structure is maintained after lithiating the $Li_3V_2O_5$.

Figures 23, 24, 25:
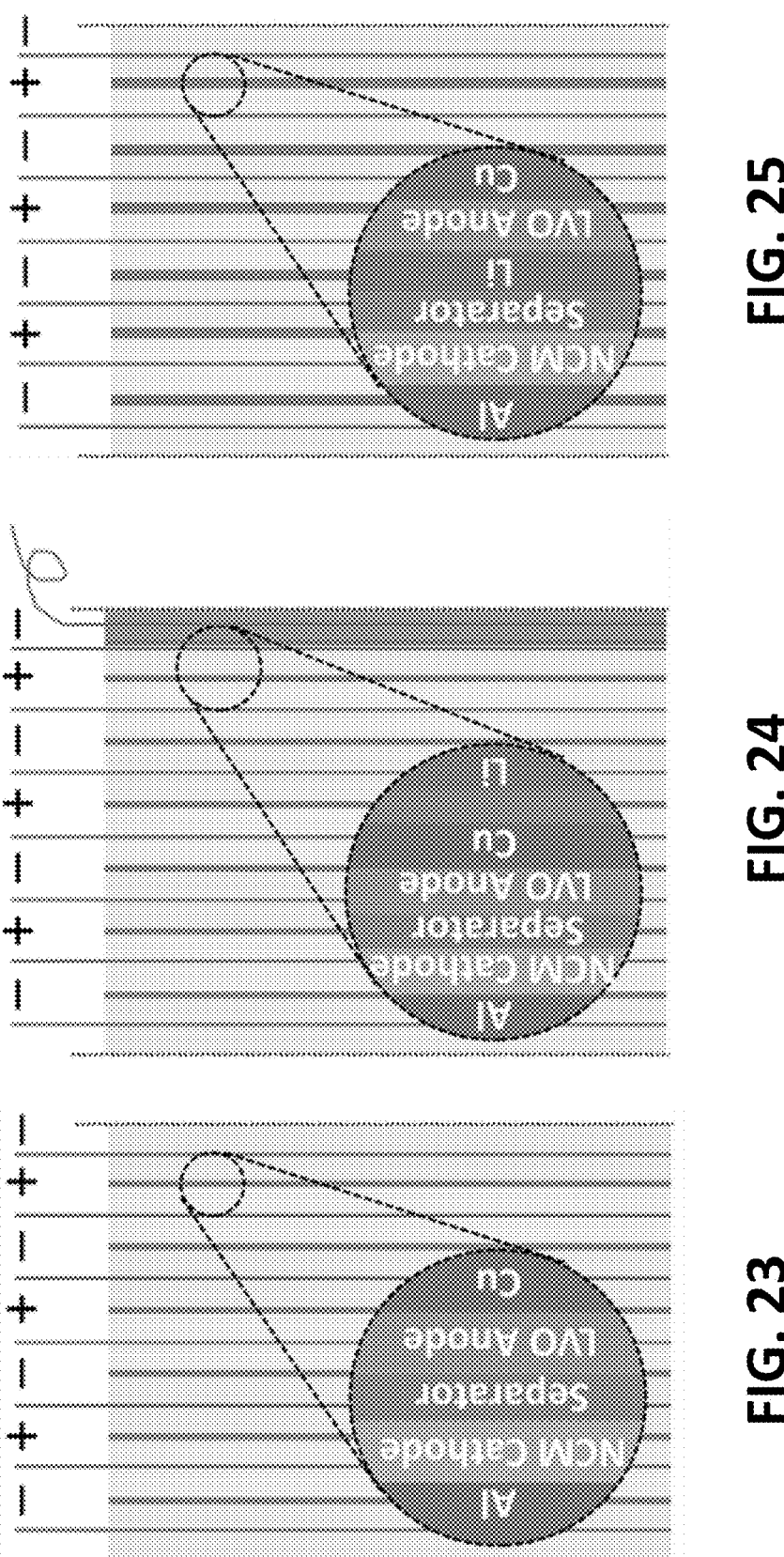
FIG. 23 illustrates an example cell configuration, in accordance with various embodiments of the present disclosure.
FIG. 24 illustrates an example cell configuration, in accordance with various embodiments of the present disclosure.
FIG. 25 illustrates an example cell configuration, in accordance with various embodiments of the present disclosure.

FIG. 23 illustrates example cell configuration 2300, in accordance with various embodiments of the present disclosure. The raw material may be $V_2O_5$. Cell 2300 may be based on an ex situ lithiation, or where the $Li_3V_2O_5$ may be lithiated chemically before cell 2300 is made. Chemical lithiation may include applying a reducing agent to a $V_2O_5$ powder. For example, the reducing agent may include n-Butyl lithium, sec-Butyl lithium, t-Butyl lithium, phenyllithium, and other reducing agents. The reducing agent may be mixed with the $V_2O_5$ in stoichiometric amounts to obtain rocksalt $Li_3V_2O_5$. The rocksalt $Li_3V_2O_5$ may be used as the anode of the cell. It should be appreciated that various well-understood fabrication methods may be used to incorporate the rocksalt $Li_3V_2O_5$ as an anode of a cell. For example, the pre-fabricated rocksalt $Li_3V_2O_5$ may be cast on, laminated to, pressed on, or otherwise coupled to a copper substrate to form the anode. A separator may be disposed onto the anode. A cathode material may be cast, pressed, laminated, or otherwise coupled on an aluminum substrate to form a cathode. The cathode may be disposed on the separator.

FIG. 24 illustrates example cell configuration 2400, in accordance with various embodiments of the present disclosure. Cell 2400 may be based on electrochemical lithiation, or synthesizing rocksalt $Li_3V_2O_5$ by applying lithium to a manufactured cell with $V_2O_5$. Electrochemical lithiation may occur by applying an electrode (e.g., lithium) to cell 2400 on the back of the anode. This electrode may be the third electrode, as the anode and the cathode represent the first and second electrodes. As illustrated, the $V_2O_5$ may be directly used as an anode material. It should be appreciated that various well-understood fabrication methods may be used to fabricate cell 2400. For example, the $V_2O_5$ may be disposed on top of a first substrate (e.g., copper) to form an anode. A separator may be disposed on top of the anode. A cathode may be formed by coupling a cathode material to a second substrate. The cathode may be disposed on top of the separator. The electrochemical lithiation may occur by applying an electrode, such as lithium, to the bottom of the anode. The lithium electrode may be used to electrochemically lithiate the anodes of cell 2400 which converts the $V_2O_5$ into rocksalt $Li_3V_2O_5$. The $V_2O_5$ electrode and the lithium electrode may be connected for electrochemical lithiation. For example, the $V_2O_5$ electrode may be the working electrode, and the lithium electrode may be the counter electrode. Discharging the $V_2O_5$ electrode against the lithium electrode may achieve $Li_3V_2O_5$. After the lithiation, the $V_2O_5$ electrode and the lithium electrode may be disconnected. The lithiated $V_2O_5$ electrode may be used as the lithiated anode of the battery.

FIG. 25 illustrates an example cell configuration, in accordance with various embodiments of the present disclosure. Cell 2500 may be based on in-situ lithiation, or synthesizing the rocksalt $Li_3V_2O_5$ by directly reacting the lithium with the $V_2O_5$ inside cell 2500. As illustrated, the $V_2O_5$ may be directly used as an anode. The $V_2O_5$ may be cast, laminated, or otherwise coupled, to a substrate that may collect current. After the $V_2O_5$ may be cast, lithium (e.g., powder, thin film, etc.) may be cast, pressed, or otherwise coupled, onto the laminated $V_2O_5$. The amount of lithium used may be based on stoichiometric ratios with $V_2O_5$. The in-situ lithiation process may be applied to every layer of the $V_2O_5$ anode. The lithium may react with the $V_2O_5$ after electrolyte injection and convert the electrodes to rocksalt $Li_3V_2O_5$.

Figure 26:
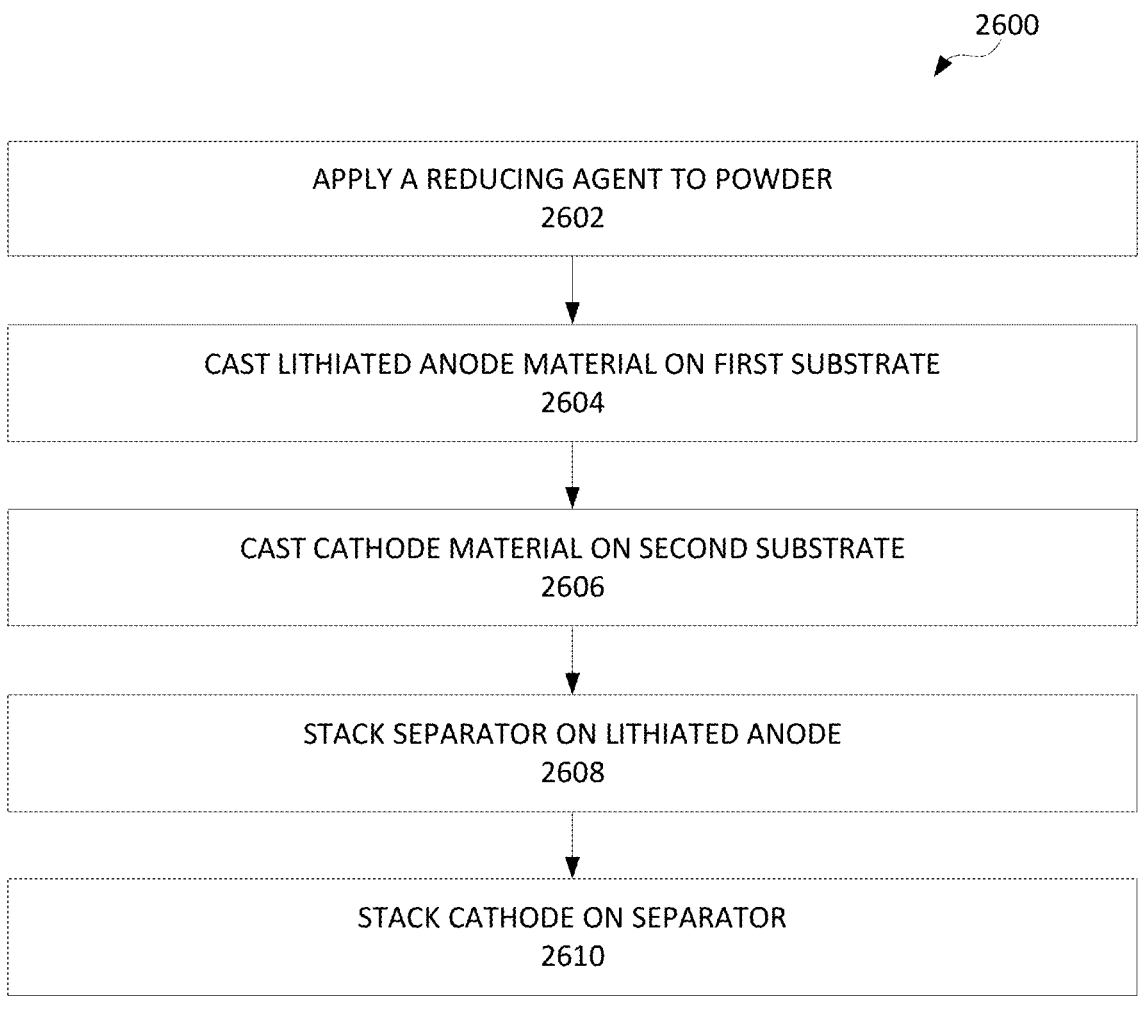
FIG. 26 is an operational flow diagram illustrating various operations that may be performed in accordance with embodiments of the disclosure.

FIG. 26 is operational flow diagram 2600 illustrating various operations that may be performed in accordance with embodiments of the disclosure. 2602 may include applying a reducing agent to a powder to synthesize a lithiated anode material. The reducing agent may include lithium. The powder may include $V_2O_5$. The lithiated anode material may be rocksalt $Li_3V_2O_5$ in a Fm$\overline{3}$m space group. 2604 may include casting the lithiated anode material on a first substrate to form the lithiated anode via ex-situ lithiation, as described herein. The first substrate may be copper. 2606 may include casting a cathode material on a second substrate to form a cathode. The second substrate may be aluminum. 2608 may include stacking a separator on the lithiated anode. 2610 may include stacking the cathode on the separator. It should be appreciated that flow diagram 2600 may be repeated multiple times to form stacked groups of cathode-separator-anode composites. These stacked groups may form a battery.

Figure 27:
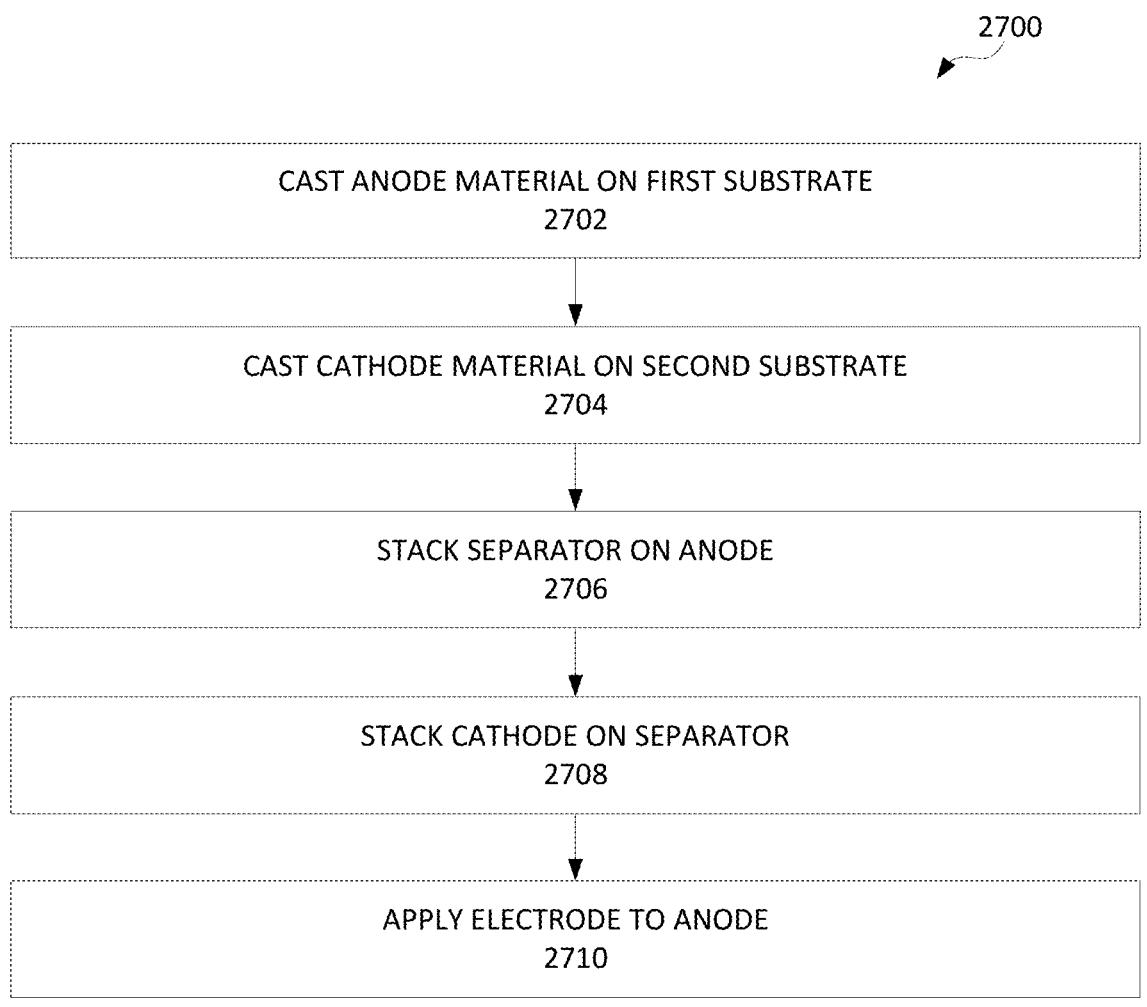
FIG. 27 is an operational flow diagram illustrating various operations that may be performed in accordance with embodiments of the disclosure.

FIG. 27 is an operational flow diagram 2700 illustrating various operations that may be performed in accordance with embodiments of the disclosure. 2702 may include casting an anode material on a first substrate to form an anode. The anode material may be $V_2O_5$. 2704 may include casting a cathode material on a second substrate to form a cathode. 2706 may include stacking a separator on the anode. 2708 may include stacking the cathode on the separator. 2710 may include applying a third electrode to a bottom of the anode to synthesize a lithiated anode via electrochemical lithiation, as described herein. The third electrode may be lithium. The first substrate, the lithiated anode, the separator, the cathode material, and the second substrate may be substantially similar to FIG. 26. It should be appreciated that flow diagram 2700 may be repeated multiple times to form stacked groups of cathode-separator-anode composites. These stacked groups may form a battery.

Figure 28:
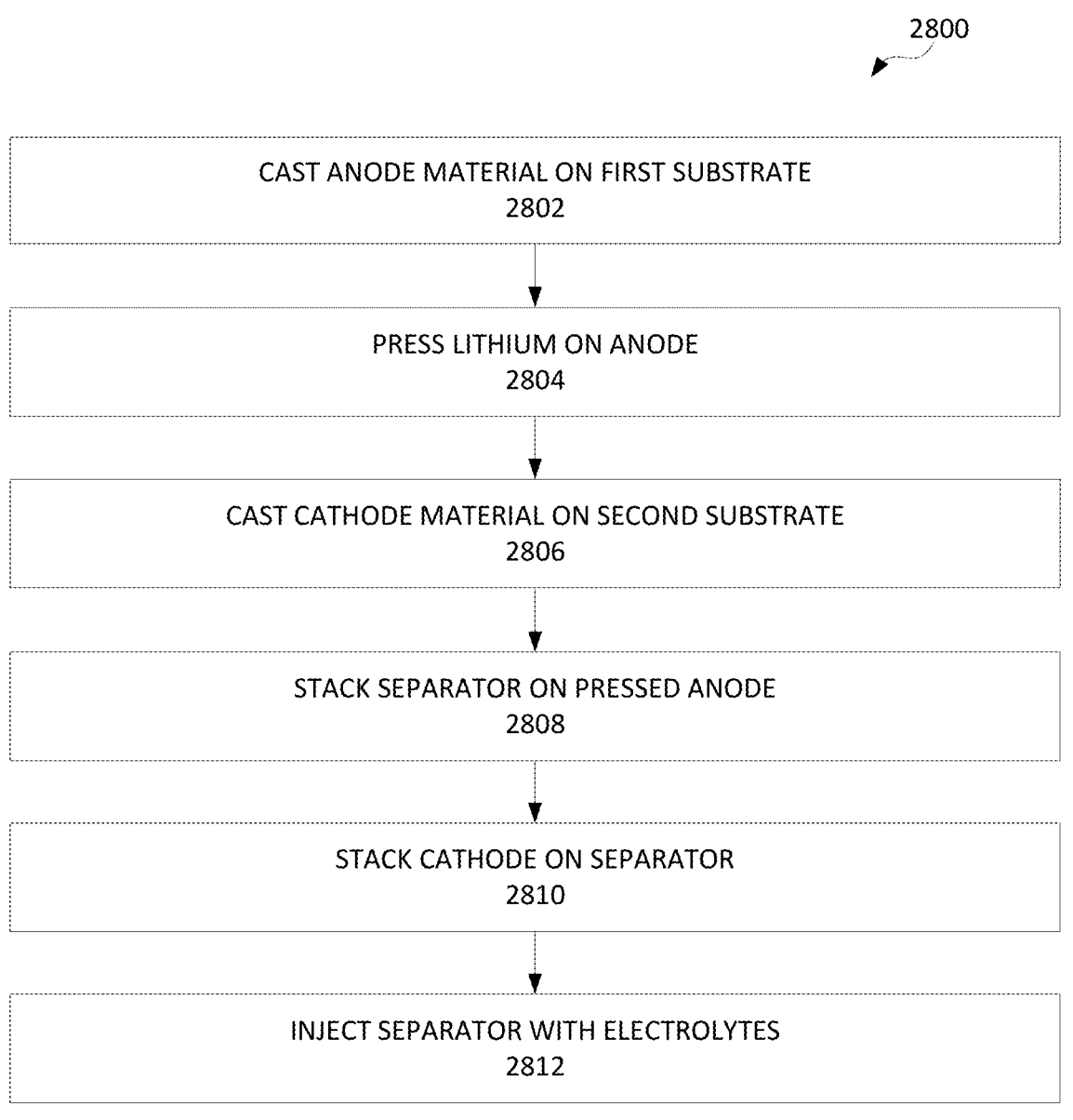
FIG. 28 is an operational flow diagram illustrating various operations that may be performed in accordance with embodiments of the disclosure.

FIG. 28 is operational flow diagram 2800 illustrating various operations that may be performed in accordance with embodiments of the disclosure. 2802 may include casting an anode material on a first substrate to form an anode. The anode material may be $V_2O_5$. 2804 may include pressing lithium on the anode to form a pressed anode. 2806 may include casting a cathode material on a second substrate to form a cathode. 2808 may include stacking a separator on the pressed anode. 2810 may include stacking the cathode on the separator. 2812 may include injecting the separator with electrolytes to synthesize the pressed anode into a lithiated anode. The first substrate, the lithiated anode the separator, the cathode, and the second substrate may be substantially similar to FIG. 26. It should be appreciated that flow diagram 2800 may be repeated multiple times to form stacked groups of cathode-separator-anode composites. These stacked groups may form a battery.

Figure 29:
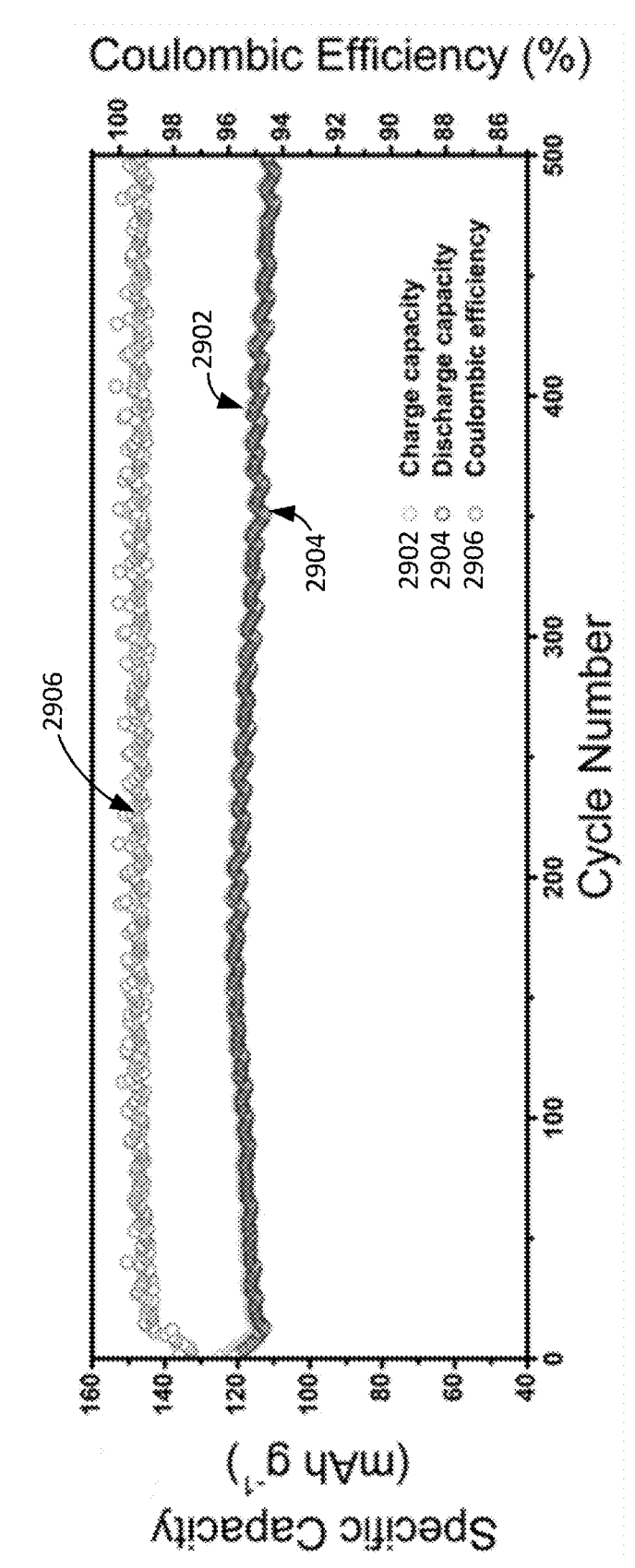
FIG. 29 is a graph illustrating performance of an example cell, in accordance with various embodiments of the present disclosure.

FIG. 29 is graph 2900 illustrating performance of an example cell, in accordance with various embodiments of the present disclosure. 2902 may represent charge capacity. 2904 may represent discharge capacity. 2906 may represent coulombic efficiency. As illustrated, the charge and discharge capacities are stable.

Figure 30:
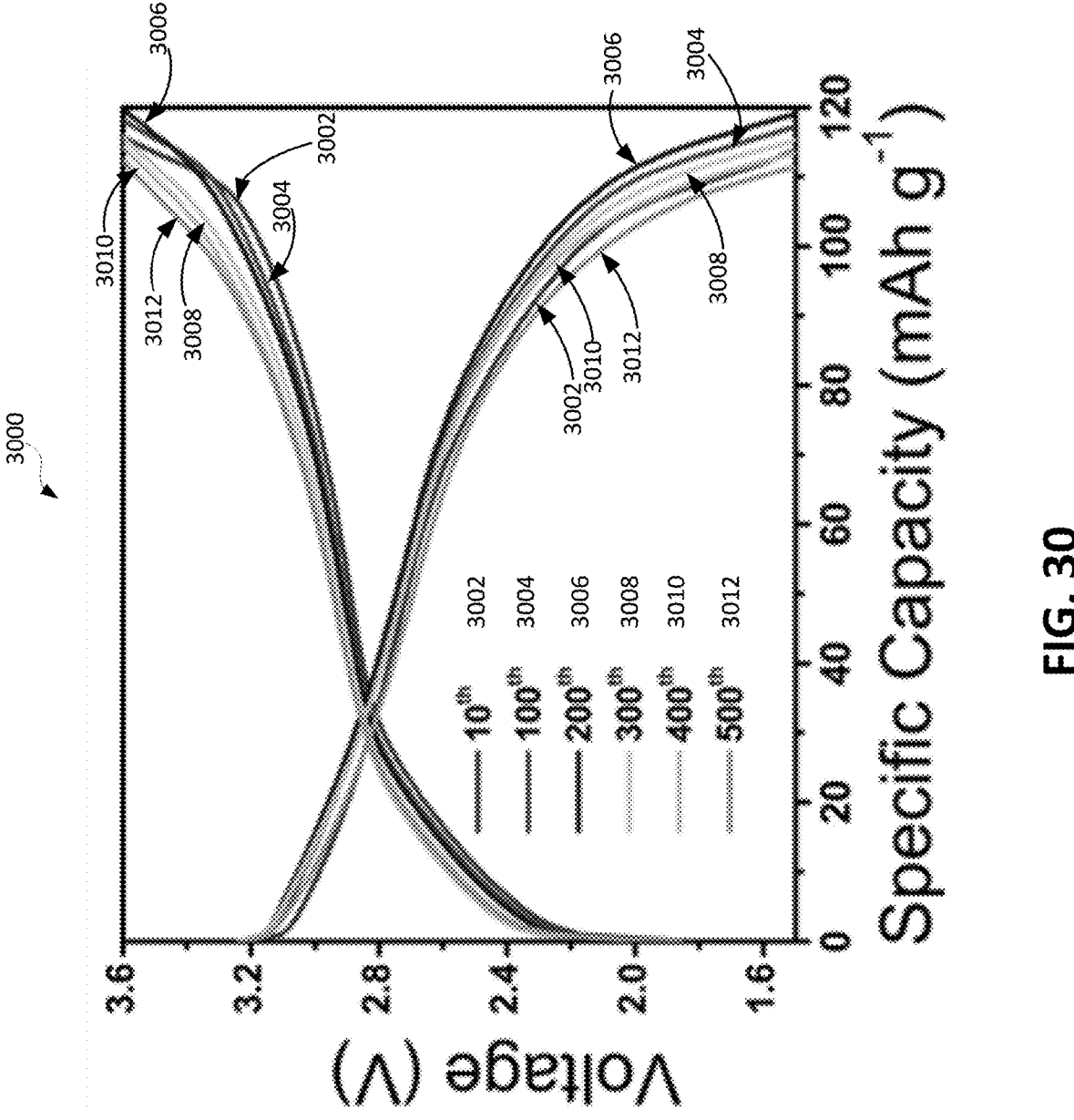
FIG. 30 is a graph illustrating voltage profiles of an example cell, in accordance with various embodiments of the present disclosure.

FIG. 30 is graph 3000 illustrating voltage profiles of an example cell, in accordance with various embodiments of the present disclosure. 3002 may illustrate a voltage profile at the 10th cycle. 3004 may illustrate a voltage profile at the 100th cycle. 3006 may illustrate a voltage profile at the 200th cycle. 3008 may illustrate a voltage profile at the 300th cycle. 3010 may illustrate a voltage profile at the 400th cycle. 3012 may illustrate a voltage profile at the 500th cycle. As illustrated, the discharge voltage begins at around 3.2 V for the about 500 cycles. The specific capacity stays at around 120 mAh/g over about 500 cycles. The voltage profiles illustrate consistent behavior of the cell over about 500 cycles.

Figure 31:
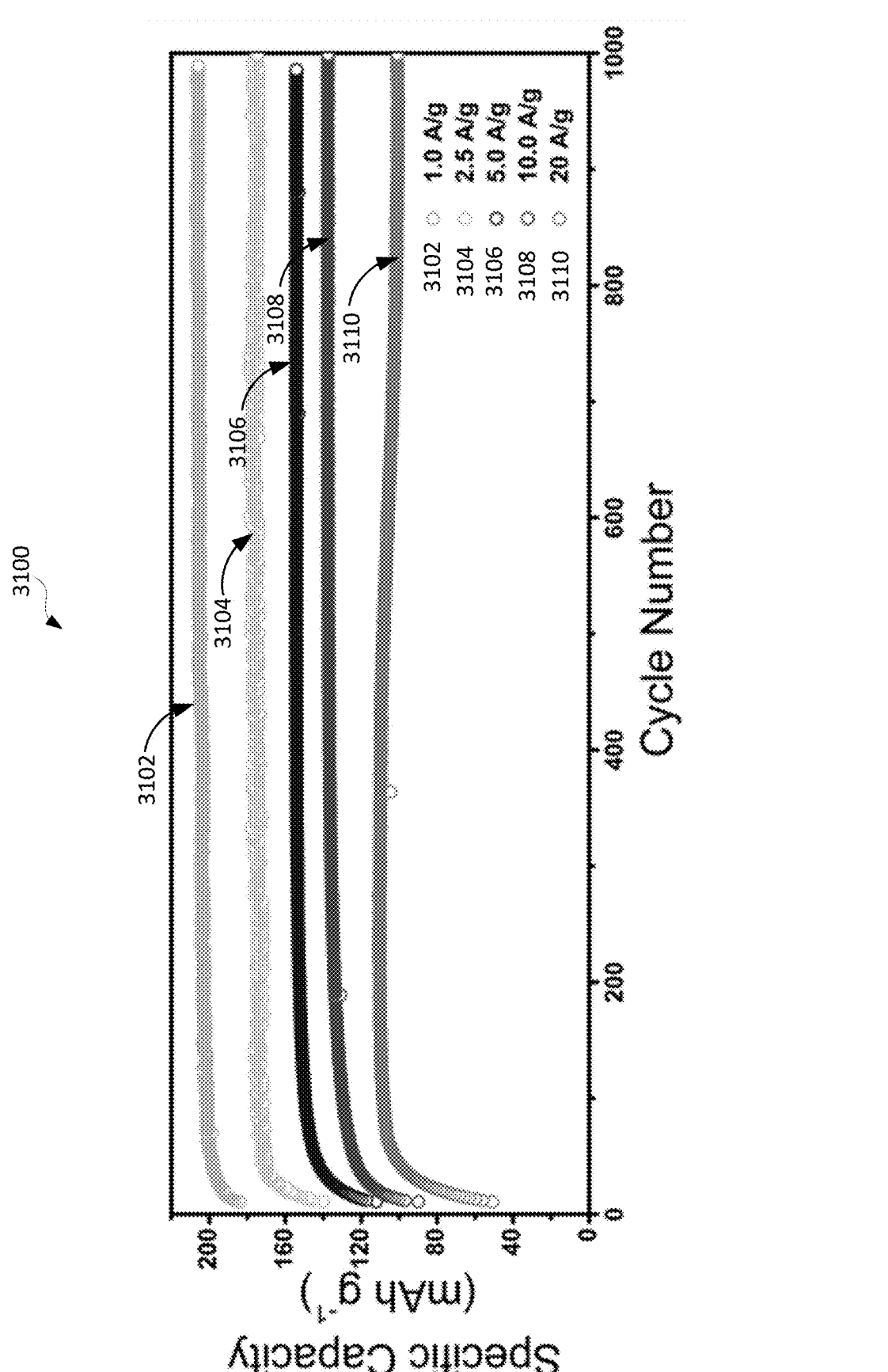
FIG. 31 illustrates graph 3100 of cycling performance of a second generation $Li_3V_2O_5$ electrode under different current density in accordance to one embodiment of the present disclosure.

FIG. 31 illustrates graph 3100 of cycling performance of a second generation $Li_3V_2O_5$ electrode under different current density in accordance to one embodiment of the present disclosure. 3102 may represent a current density of about 1.0 A/g. 3104 may represent a current density of about 2.5 A/g. 3104 may represent a current density of about 5.0 A/g. 3104 may represent a current density of about 10.0 A/g. 3104 may represent a current density of about 20 A/g. Graph 3100 illustrates high stability and high rate capability over a thousand cycles.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. It will be apparent to one of skill in the art how alternative functional, logical or physical partitioning and configurations can be implemented to implement the desired features of the technology disclosed herein. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An anode material for use in an anode of a lithium-ion battery, wherein the anode material comprises $Li_{3+x}V_{2\pm y}O_{5\pm z}$, wherein $0<x\leq2$, $0\leq y\leq1$, and z is based on the charge resulting from $Li_{3+x}$ and $V_{2\pm y}$, wherein the $Li_{3+x}V_{2\pm y}O_{5\pm z}$ is an omega structure, and wherein the omega structure is a disordered rocksalt structure in the $Fm\overline{3}m$ space group, and wherein the anode material is characterized by a voltage plateau from about 0 V to about 1 V.

2. The anode material of claim 1, wherein the $Li_{3+x}V_{2\pm y}O_{5\pm z}$ is $Li_4V_{2\pm y}O_{5\pm z}$.

3. The anode material of claim 1, wherein the $Li_{3+x}V_{2\pm y}O_{5\pm z}$ is $Li_5V_{2\pm y}O_{5\pm z}$.

4. The anode material of claim 1, wherein the anode material further comprises a dopant M.

5. The anode material of claim 4, wherein the dopant M is selected from one or more of Mg, Ca, Sc, B, Y, Al, Ti, Zr, Nb, Ta, Cr, Mo, or W.

6. The anode material of claim 1, further comprising one or more materials selected from silicon, tin, graphite, or non-graphitized carbon.

7. The anode material of claim 1, wherein the anode material is present within an anode, wherein the anode further comprises one or more materials selected from silicon, tin, graphite, or non-graphitized carbon.

8. The anode material of claim 1, wherein the voltage plateau is about 0.5 V.

\* \* \* \* \*